Sept. 16, 1969  H. A. JENSEN ET AL  3,467,240
PRODUCT LOADING CONVEYOR FOR CONTINUOUS PACKAGE FORMING MACHINE
Original Filed Nov. 4, 1964  7 Sheets-Sheet 1
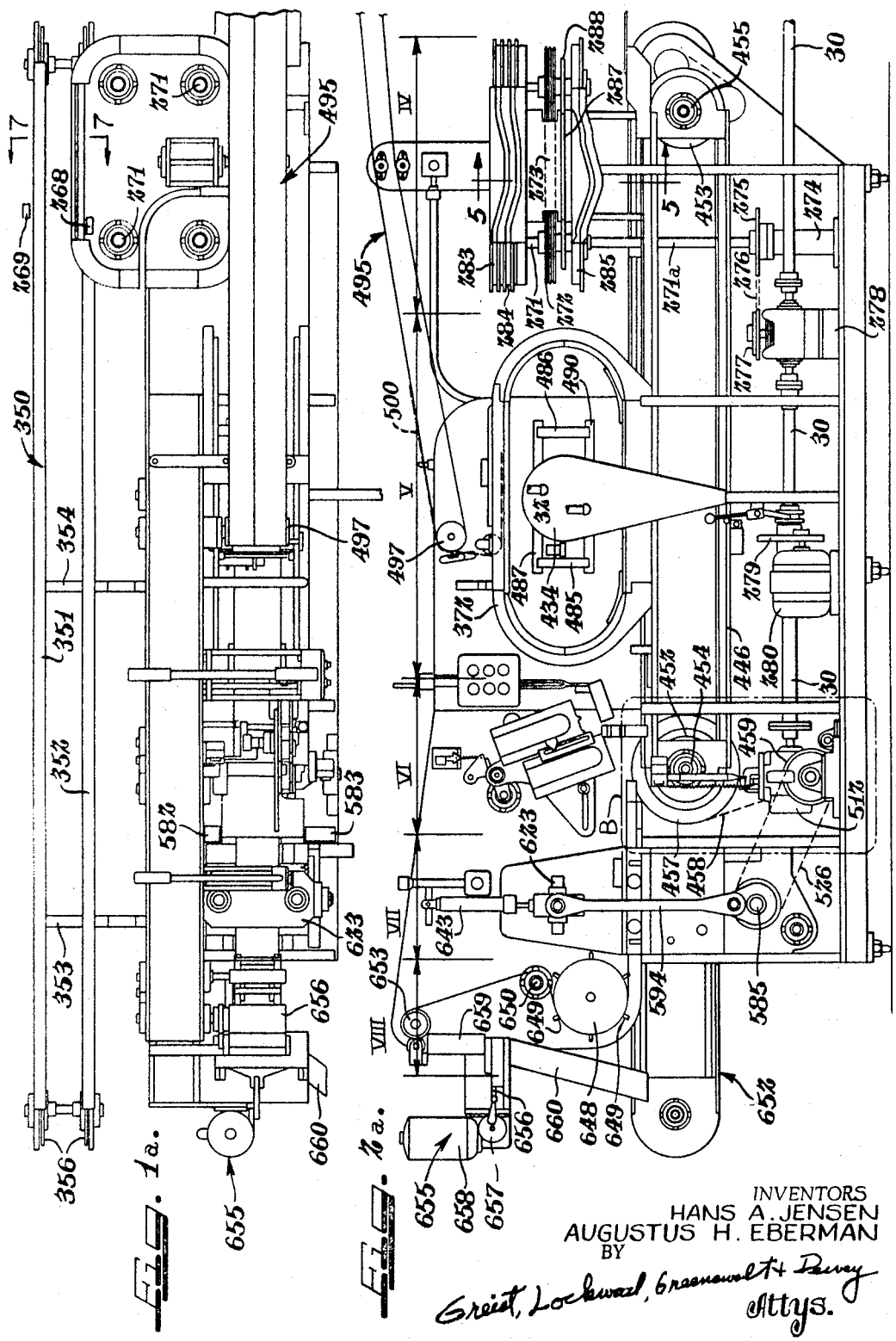
INVENTORS
HANS A. JENSEN
AUGUSTUS H. EBERMAN
BY
Greist, Lockwood, Greenawalt & Dewey
Attys.

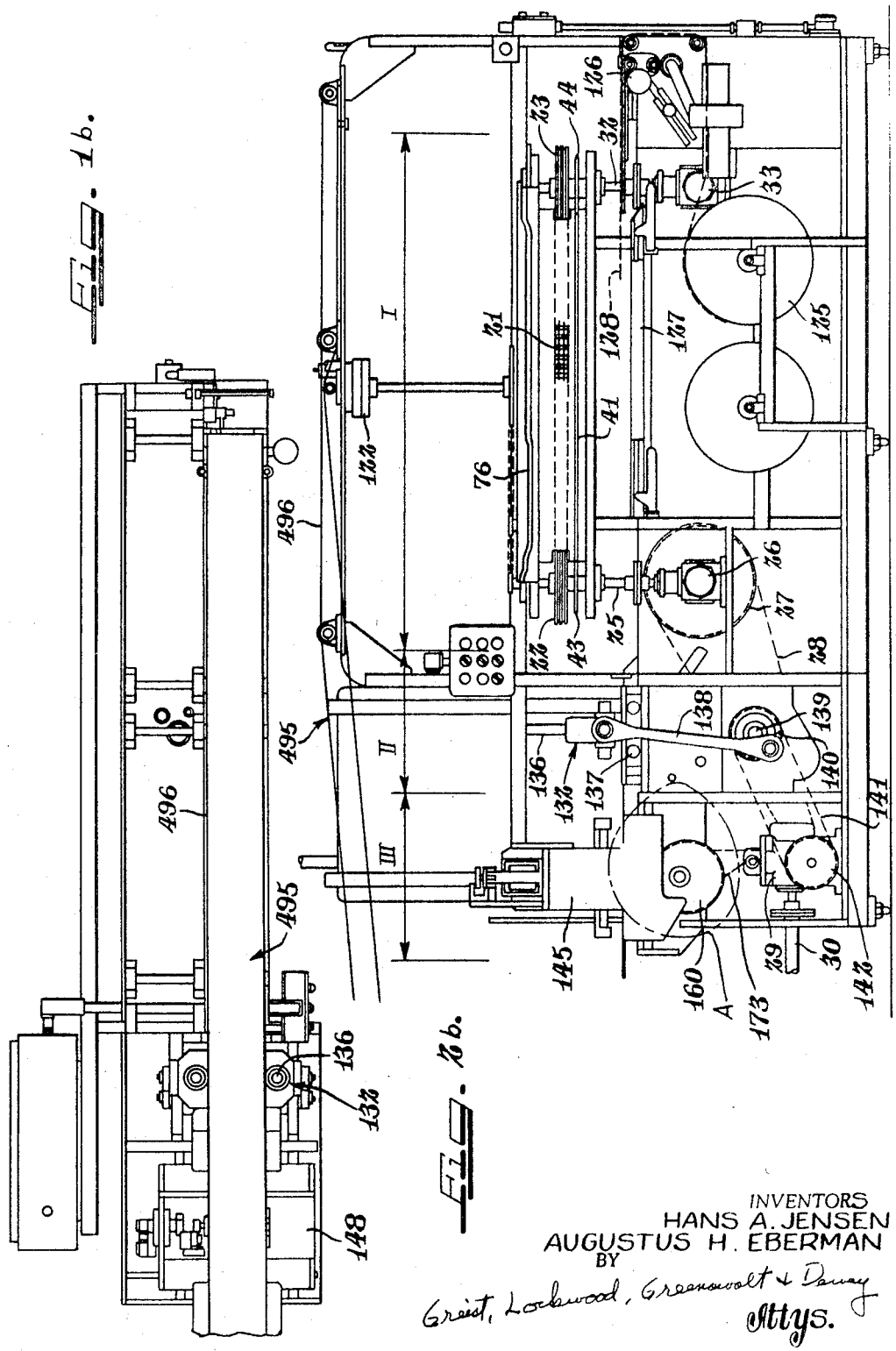

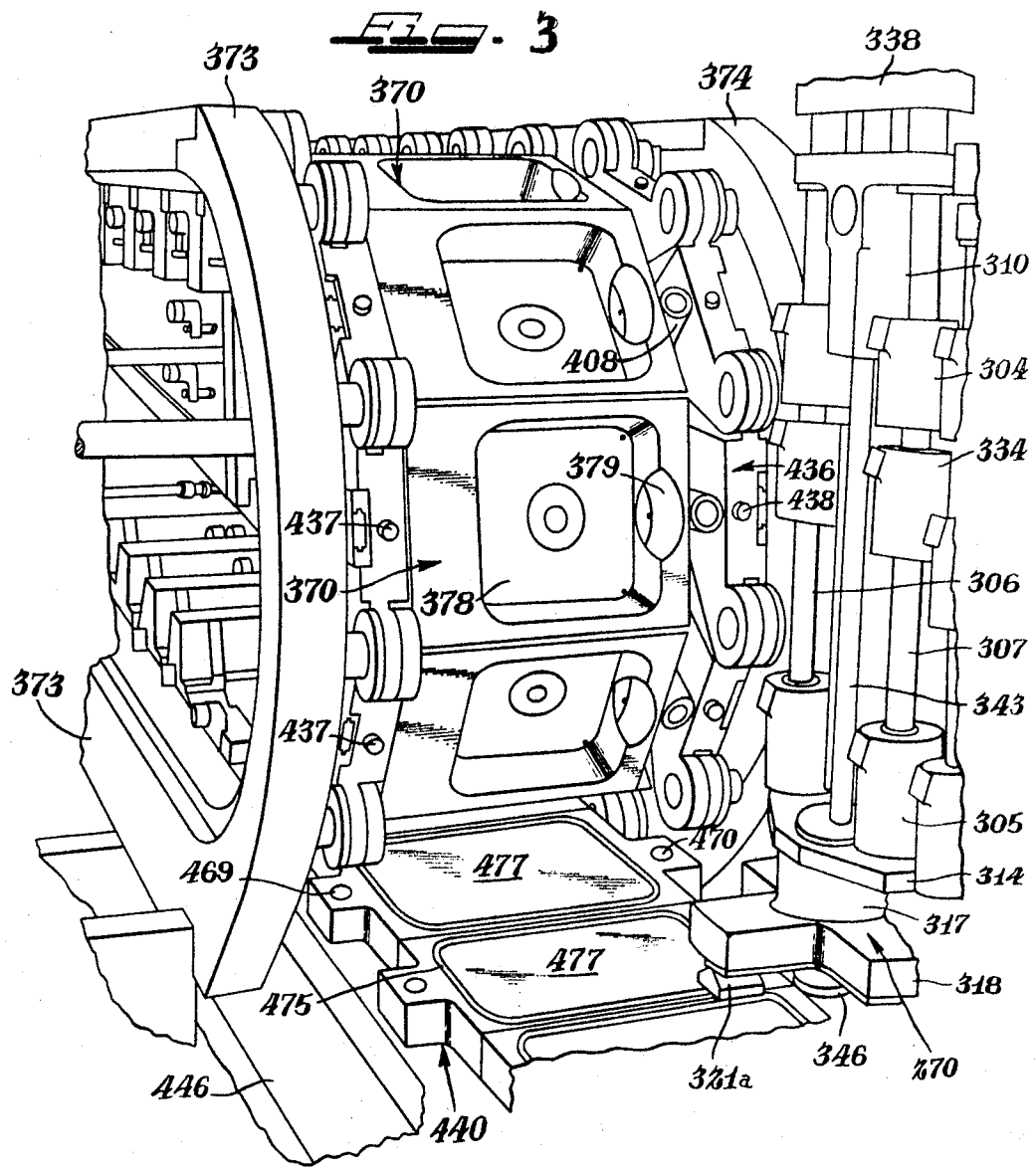

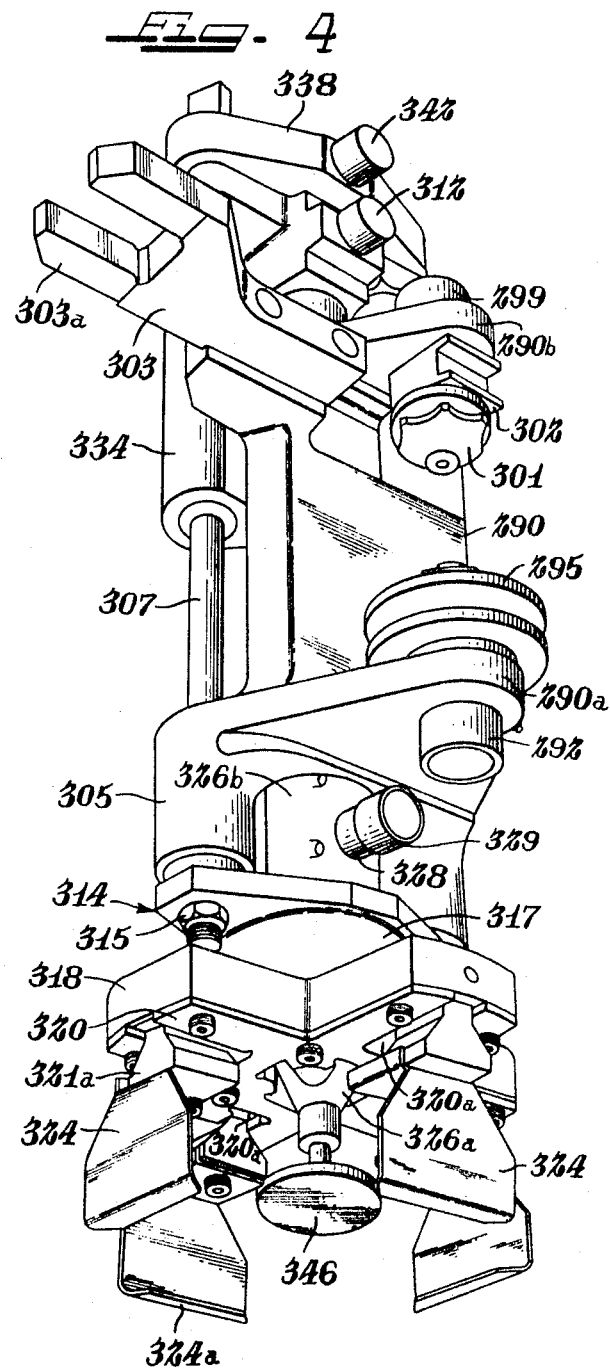

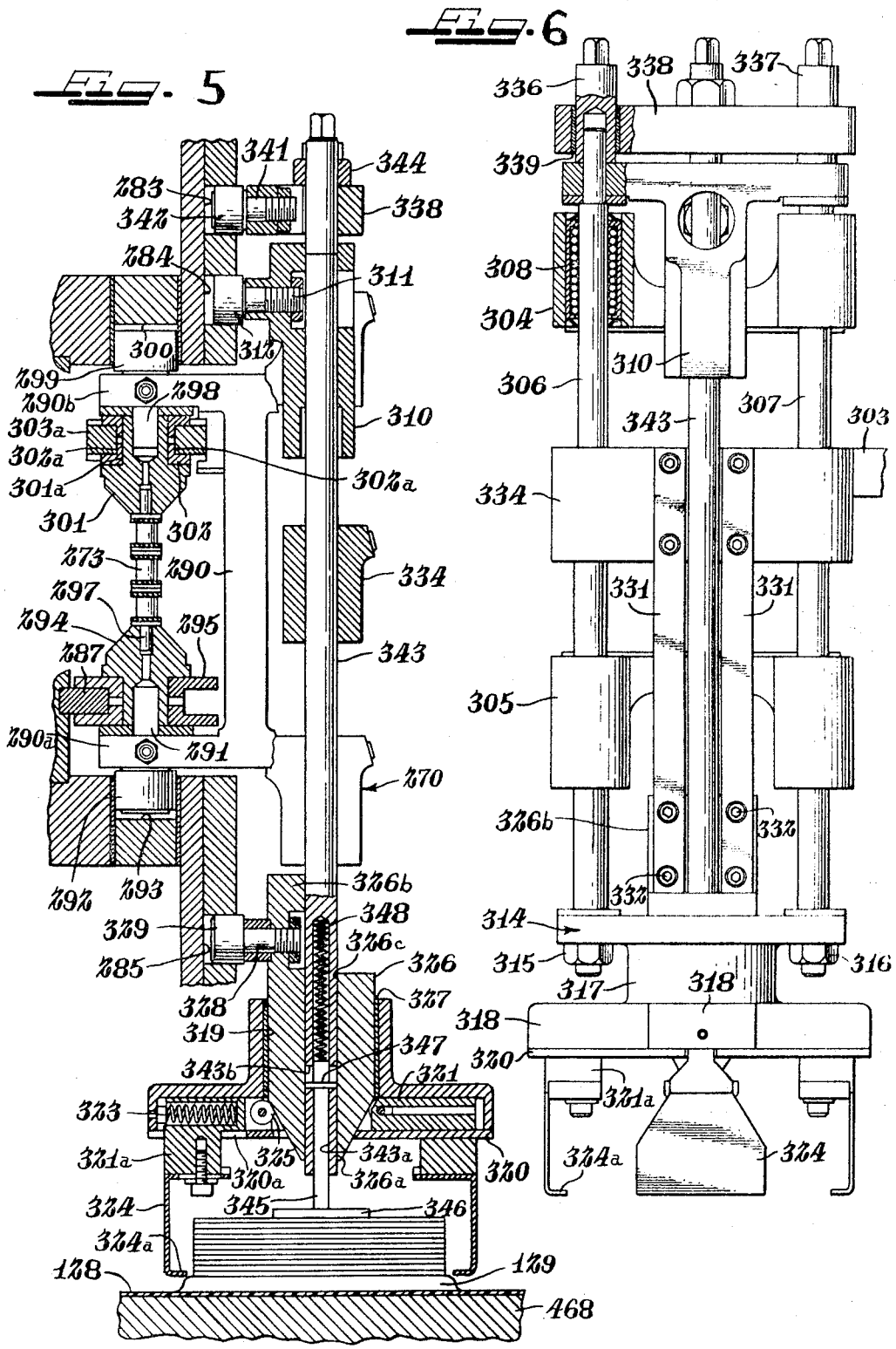

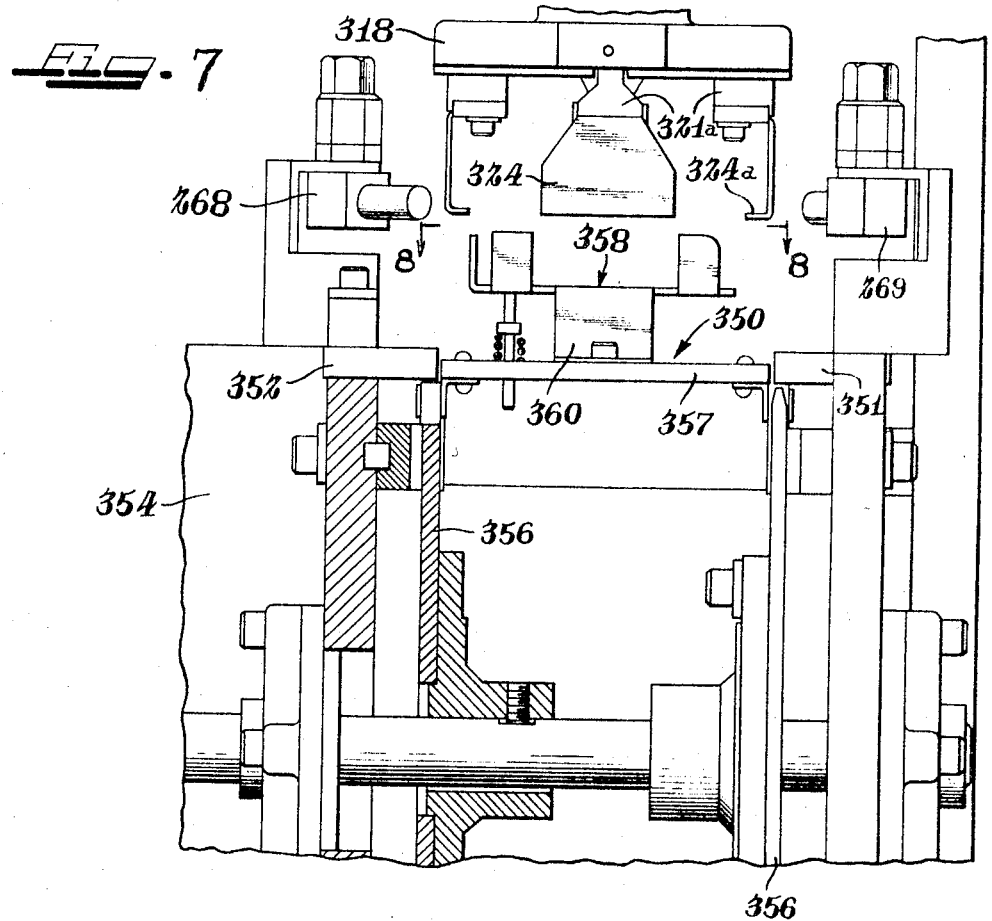
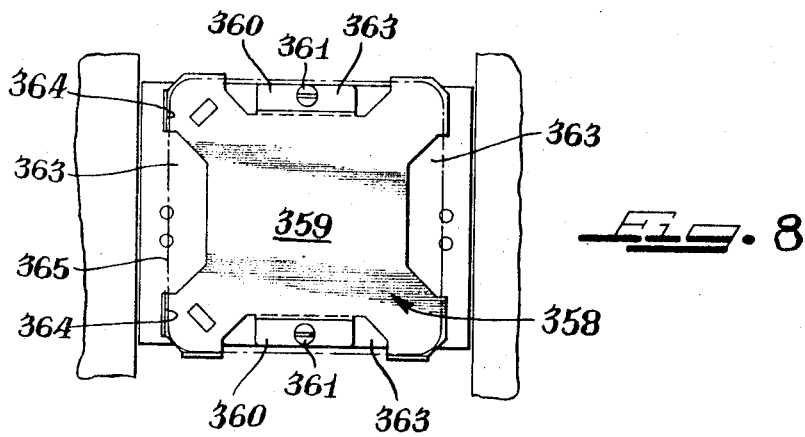

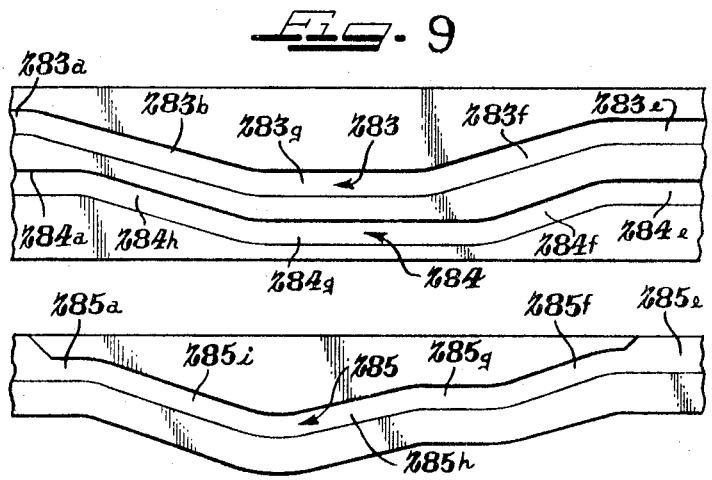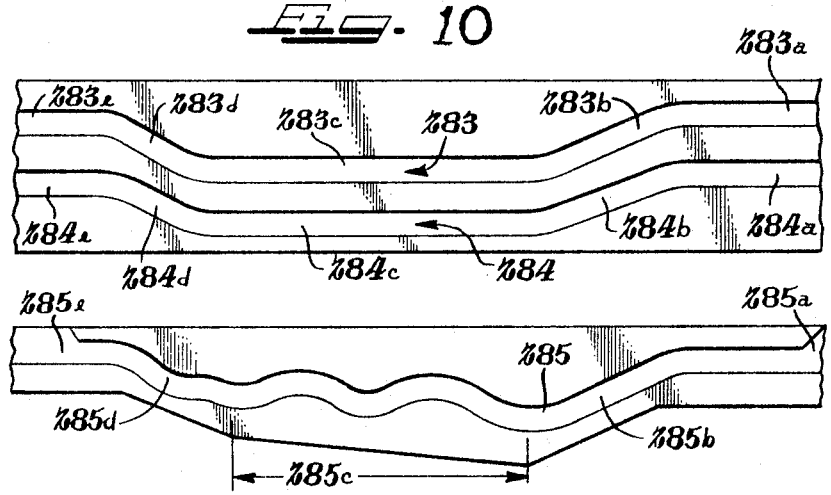

United States Patent Office 3,467,240
Patented Sept. 16, 1969

3,467,240
PRODUCT LOADING CONVEYOR FOR CONTINUOUS PACKAGE FORMING MACHINE
Hans A. Jensen and Augustus H. Eberman, Madison, Wis., assignors to Oscar Mayer & Co., Inc., Chicago, Ill., a corporation of Illinois
Original application Nov. 4, 1964, Ser. No. 408,842, now Patent No. 3,349,540, dated Oct. 31, 1967. Divided and this application Mar. 27, 1967, Ser. No. 651,071
Int. Cl. B65g 15/00, 17/00, 19/00
U.S. Cl. 198—179
5 Claims

ABSTRACT OF THE DISCLOSURE

The product loading conveyor for depositing stacks of sliced meat products on the lower die plates of a continuous packaging machine includes a plurality of loading assemblies mounted for movement in a horizontal endless path. Each loading assembly has four claws engageable with a stack adjacent respective sides thereof. The claws are mounted for movement between inner and outer positions for gripping the stacks of sliced products and for releasing the stacks onto the lower die plates in timed relation with movement therewith. After the stacks of sliced products are picked up from a delivery conveyor and before they are deposited onto the lower die plates of the package forming machine, the claws are reciprocated several times between their inner and outer positions thereby to shuffle the slices within each stack to aid in aligning the slices with each other.

---

The present invention is a division of Jensen et al. application Ser. No. 408,842, filed Nov. 4, 1964, now Patent No. 3,349,540. The present invention may be used in association with the continuous package forming machine disclosed and claimed in the aforesaid Jensen et al. application and reference should be made to such application for a fuller description and explanation of any of the components of the package forming apparatus referred to herein.

A primary object of the present invention is to provide a new and improved mechanism for successively depositing products on a web of package forming material as the latter is being advanced, which mechanism is primarily adapted to handle stacks of sliced food products and includes means for vertically aligning such stacks of food products before they are deposited on the web.

Other objects and advantages of the invention will become apparent from the following specification disclosing a preferred embodiment of the invention which is illustrated in the accompanying drawings.

In the drawings:

FIG. 1a is a top plan view of a downstream portion of a continuous package forming apparatus with which the present invention may be associated;

FIG. 1b is a continuation of FIG. 1a showing the remaining or upstream portion of the package forming apparatus;

FIG. 2a is a side elevation view of the portion of the package forming apparatus illustrated in FIG. 1a;

FIG. 2b is a continuation of FIG. 2a showing a side elevation of the upstream portion of the package forming apparatus shown in FIG. 1b;

(The side of the package forming apparatus illustrated in FIGS. 2a and 2b will be termed herein as the near side, and the opposite side of the package forming apparatus will be termed herein as the far side.)

FIG. 3 is an enlarged perspective view as seen from the near side of the package forming apparatus looking downstream, and fragmentarily showing one of the endless series of product loading assemblies of this invention and also showing the packaging zone of the package forming apparatus which includes an endless series of upper die plate assemblies adapted to bring the upper film into overlying relation with the lower sheet or film;

FIG. 4 is a perspective view of one of the product loading assemblies;

FIG. 5 is an enlarged partial vertical section and partial elevation taken generally along line 5—5 of FIG. 2a;

FIG. 6 is an elevational view of one of the product loading assemblies with a portion thereof being broken away and shown in section;

FIG. 7 is an enlarged partial vertical section and partial elevation taken along the line 7—7 of FIG. 1a;

FIG. 8 is a view taken along line 8—8 of FIG. 7;

FIG. 9 is a diagrammatic view of cam tracks on the near side of the product loading apparatus, which cam tracks operate certain components of the product loading assemblies; and FIG. 10 is a diagrammatic view of cam tracks on the far side of the product loading apparatus, which cam tracks are a continuation of the cam tracks shown in FIG. 9.

Now referring to the drawings, the product loading mechanism, which constitutes Zone I (FIG. 2b) of the package forming machine, will be seen to include an endless series of product loading assemblies each generally designated 270. The product loading assemblies themselves are not illustrated in FIGS. 1a and 2a; only the mounting structure for the product loading assemblies 270 is illustrated in these two figures. This supporting structure includes means supporting four vertical shaft 271, each of which shafts supports a horizontally disposed sprocket wheel 272. These sprocket wheels support a drive chain 273 for movement in an endless horizontal path. One of the shafts 271 includes a depending extension 271a (FIG. 2a) journaled at its lower end in a sleeve 274. A sprocket wheel 275 is mounted on shaft extension 271a, which sprocket wheel is driven by a belt or chain 276 trained around a drive wheel 277 associated with a gear box 278. Main drive shaft 30 extends through gear box 278 and is suitably connected with wheel 277 so that the latter is rotated upon rotation of the main drive shaft. It will be apparent that rotation of drive shaft 30, which is suitably driven from a belt or chain 279 in turn driven by a main drive motor 280, causes movement of chain 273 about its various supporting sprockets. (The chain is actually supported between the sprockets by the attachment of the chain with the various loading assemblies.)

The supporting structure for the product loading assembly includes suitable means defining endless cam tracks 283, 284 and 285. The supporting structure for the product loading assemblies also includes four horizontally extending bars (one bar is illustrated in FIG. 2a and designated 287) having their opposite ends joining tangentially with guide wheels 288 mounted on respective vertical shafts 271.

It will be understood that an endless series of product loading assemblies 270 are driven by chain 273 for movement in an endless path. As all the product loading assemblies are identical, only one assembly will be described in detail.

Now referring to FIGS. 4 through 6, the product loading assembly 270 will be seen to include a casting 290 having an integral lug 290a provided with a vertical bore receiving a pin 291 which rotatably supports a guide roller 292. Guide roller 292 is received in a guideway 293 which is formed by the supporting structure of the product loading assemblies. It will be understood that guideway 293 is continuous, and generally rectangular in form with rounded corners. The shape of this guideway follows the shape of the supporting structure of the product carrying assemblies illustrated in plan view in FIG. 1a. Pin 291 rotatably supports a bushing which has an annular groove receiving a flanged roller 295, which roller receives guide bar 287 and guide wheels 288 when the associated product loading assembly corners in moving along its endless path. Bushing 294 is centrally bored for receiving the lower end of a pin 297 forming a part of a drive chain 273.

Casting 290 includes an upper integral lug 290b provided with a vertical bore supporting a pin 298 which rotatably support a guide roller 299. Guide roller 299 is received in an endless guideway 300, which guideway is the same shape as guideway 293 and in overlying confronting relation with the latter. Pin 298 rotatably supports a bushing 301, which bushing includes a reduced-in-diameter portion 301a received in a bore in a block 302. Block 302 has oppositely facing recesses 302a receiving the bifurcated portion 303a of a guide number 303 which is mounted on the adjacent product loading assembly. Guide member 303 on the product carrying assembly illustrated is shown in FIG. 4. This guide member serves to prevent the product carrying assemblies from pivoting about an axis defined by the pins 291, 298 when the product carrying assemblies travel along their linear path portions. Bushing 301 includes a central bore receiving the upper end of pin 297 which forms a part of chain 273.

It will be apparent that castings 290 are mounted by rollers 292, 295 and 299 for movement in an endless horizontal path, and that movement of chain 273 brings about corresponding movement of the castings.

Casting 290 includes integral upper and lower journal portions 304 and 305, respectively, each being provided with a pair of vertically extending bores for slidably supporting a pair of rods 306 and 307. Preferably, each journal portion of the casting includes a bearing assembly in its vertical bore for slidably supporting the associated rod. One such bearing assembly is illustrated in FIG. 6 and designated 308.

Rods 306 and 307 have reduced-in-diameter upper end portions suitably fastened in bores in oppositely extending portions of a T-member 310. T-member 310 includes a horizontally extending bore mounting a pin 311, which pin rotatably supports a cam roller 312. Roller 312 is received in cam track 284.

The lower ends of rods 306, 307 include reduced-in-diameter threaded portions secured in bores in an upper portion of a claw housing 314 an secured to the housing by means of nuts 315 and 316. Housing 314 includes a central hub portion 317 having four, equally spaced, radially extending portions 318. As noted in FIG. 5, housing portions 318 are hollow and open at their inner ends into a bore 319 in hub 317. A plate 320, generally in the form of a cross (FIG. 4), is secured to the underside of housing 314 thereby forming bottoms for the housing portions 318. Each housing portion 318 in the associated leg of plate 320 forms a generally rectangular in cross section, radially extending slideway slidably supporting a block 321, which block has a depending portion 321a extending through a suitable slots 320a formed in plate 320. Each block 321 includes a blind bore receiving a coil spring 323, which spring engages the closed end of the associated housing portion 318 for urging the block radially inwardly of housing 314.

Each block 321 supports a claw 324 which has a vertically extending planar portion with an integral, radially inwardly extending finger portion 324a. Each block 321 also rotatably supports roller 325 adapted to be engaged by the frusto-conical surface 326a of a generally cylindrical camming member 326 which is mounted for vertical reciprocable movement in a sleeve 327 secured in bore 319 of housing 314. It will be understood that housing 314 includes four claws, all of identical construction and mounting, and spring biased radially inwardly with their respective rollers in engagement with frusto-conical cam portion 326a.

It should be understood at this time that T-member 310, rods 306, 307, housing 314 and the components associated therewith with the exception of cam member 326, constitute a sub-assembly supported from casting 290 for vertical reciprocable movement relative to the latter. Vertical reciprocable movement of this sub-assembly is controlled by cam roller 312 in cam tract 284.

As noted in FIG. 5, cam member 326 includes an integral upstanding portion 326b having a horizontally extending bore mounting a pin 328, which pin rotatably mounts a cam roller 329. Cam roller 329 is received in cam track 285. As noted in FIG. 6, a pair of parallel, vertically extending bars 331 are secured to cam member portion 326b by suitable fasteners 332. The upper ends of bars 331 are secured to a cross slide 334, which cross slide member includes a pair of vertical bores at its respective opposite ends slidably receiving rods 306 and 307. It should be apparent that cam member 326, bars 331, and cross slide member 334 are adapted to move together as a unit for vertical sliding movement relative to rods 306, 307, housing 314 and the claws of the latter. Movement of cam member 326 and the members secured thereto, which serve as a guide, is controlled by cam roller 329 riding in cam track 285. It will be apparent from FIG. 5 that when cam roller 329 is urged downwardly for moving cam 326 downwardly relative to the sub-assembly including housing 314, all four claws 324 will be simultaneously cammed radially outwardly and that upon upward movement of cam 326 relative to housing 314, all four claws will be simultaneously urged inwardly by their associated springs 323.

The reduced-in-diameter threaded upper ends of rods 306 and 307 are threadingly engaged in a pair of sleeves 336 an 337 respectively. Sleeves 336, 337 act to secure the upper ends of rods 306 and 307 to T-member 310, and these sleeves serve as slidable supports for mounting a bar 338. Bar 338 includes vertical bores at its respective opposite ends, which bores support suitable sleeve-like inserts slidably engaging sleeves 336 and 337. One insert is illustrated in FIG. 6 and designated 339. Bar 338 has a rearwardly extending portion which is bored for mounting a pin 341. This pin rotatably supports a cam roller 342, which cam roller is received in cam track 283.

A rod 343 extends through a bore in bar 338, which rod has the upper end thereof suitably secured to the bar as by means of fastening means 344. It will be understood that bar 338 and rod 343 are secured together for movement as a unit. Rod 343 extends vertically downwardly between bars 331 and through a bore 326c extending through cam member 326 centrally of the same. Rod 343 includes a blind bore 343a in its lower end, which blind bore slidably supports a pin 345. A disk-like pad 346 is secured to the lower end of pin 345 for engagement with the top of a stack of sliced food products for a purpose to be explained hereinbelow. Pin 345 includes a transversely extending through bore supporting a pin 347, the opposite ends of which pin extend beyond the outer surface of pin 345 and are received in axially extending slots 343b formed in the lower end of rod 343. The engagement of the opposite ends of pin 347 with the ends of slots 343b defines the stroke of movement of pin 345 in rod 343. A coil spring 348 is housed within the upper end of blind bore 343a, which spring has its lower end in engagement with the upper end of pin 345 thereby to urge the latter to its lowermost limit within the blind bore of rod 343. It will be understood that bar 338, rod 343, pin 345 and pad 346 move together as a unit (until the pad contacts a stack of products) for vertical reciprocable movement relative to the other components of the product carrying assembly, such movement being controlled by roller 342 rolling along cam track 283.

Referring now to FIGS. 1a and 7, a product feed conveyor, generally designated 350 is suitably mounted on the far side of the package forming machine and arranged so that it has an upper horizontal run traveling in the opposite direction as the base web of package forming material and with a speed equal to the speed of the latter. Feed conveyor 350 delivers products for being picked up by the product loading assemblies for loading or depositing on the formed package bases 477 (FIG. 3).

Feed conveyor 350 includes parallel, laterally spaced, longitudinally extending upper frame members 351 and 352, which members are mounted on suitable supporting members 353 and 354 extending from the far side of the package forming apparatus. It will be understood that the feed conveyor includes a pair of chains trained over sprocket wheels 356 rotatably mounted at opposite ends of the framework of the feed conveyor. The chains support a plurality of spaced, rectangular plates 357. A platform 358 is supported on each conveyor plate 357.

Referring now to FIGS. 7 and 8, platform 358, which may be formed from a single plate, includes a raised base portion 359 supported in parallel, spaced relation from plate 357 by a pair of legs 360 having their ends bent and secured to plate 357 by fasteners 361. Platform base portion 359, which is generally rectangular in form, includes a recess 363 in each of its sides. Base portion 359 includes integral, upstanding ears 364 at two of its sides, which ears serve as guides for locating a stack of sliced products (indicated by phantom line 365 in FIG. 8) on platform base portion 359. It will be apparent that marginal portions of the undersurface of the lowermost slice of a stack of products having an outline represented by phantom line 365 will overlie recesses 363 and will therefore be exposed.

FIG. 9 illustrates, in diagrammatic form, the shape of the portions of cam tracks 283, 284 and 285 which extend along the linear path of travel of the product loading assemblies as they move along the near side of the package forming apparatus. In like manner, FIG. 10 illustrates, in diagrammatic form, the shape of the portions of these cam tracks which extend along the linear path of travel of the product loading assemblies on the far side of the apparatus, i.e., over feed conveyor 350. The connecting portions of the cam tracks which are not illustrated in FIGS. 9 and 10 consist of suitable supporting structure defining cam tracks extending in parallel planes and having the cross sectional shape illustrated in FIG. 5.

The operation of the product loading apparatus of this invention is as follows:

A cycle of operation of each of product loading assemblies 270 commences when cam rollers 342, 312, 329 are received in respective cam track portions 283a, 284a and 285a, respectively (FIG. 10). When the cam rollers of one of the product loading assemblies are in these portions of the cam tracks, the sub-assembly including T-member 310, rods 306, 307, housing 314, is in its uppermost position with respect to casting 290. Rod 343 and pad 346 are in their uppermost position, and cam 326 is in its lowermost position with respect to housing 314 for holding the claws in their spread or open configuration. As the various cam rollers enter cam track portions 283b, 284b and 285b, the associated package delivery assembly is brought into overlying relation with one of the platforms of the feed conveyor in timed relation with movement of the latter.

As the rollers of a loading assembly are urged downwardly by cam track portions 283b, 284b and 285b, all vertically movable components of the product loading assembly are moved downwardly in unison relative to the casting of the assembly. When the rollers are cammed to their lowermost positions upon entering cam track portions 283c, 284c and 285c, claws 284 of the associated product loading assembly will be disposed at the edges of a stack of the products with the claws 324a being disposed outwardly and just beneath the lowermost slice in a stack of products supported on the corresponding platform 358 of the feed conveyor.

It should be mentioned at this time that the stacks of food products are manually placed on the platforms with the edges of the stacks abutting the guides of the platforms which are formed by integral ears 364. Of course, it will be realized that automatic means could be provided for loading the stacks of products onto the platforms of the feed conveyor.

Now continuing, as cam rollers 342 and 312 travel along cam track portions 283c and 284c, respectively, housing 314 and pad 346 remain at a constant elevation. During this time, cam roller 329 travels along cam track portion 285c which is of serpentine form. This portion of the cam track acts to reciprocate cam roller 329 a number of times with each successive stroke being slightly less than the preceding stroke. This movement of cam roller 329 imparts corresponding movement to cam 326 thereby to close and open the claws 324 a number of times. The various parts of the claws and cam 326 are so arranged with respect to the configuration of cam portion 285c, that the claws are first allowed to move inwardly with claw finger portions 324a passing beneath marginal portions of the undersurface of the lowermost slice in a stack of products until the inner surfaces of the vertical planar portions of the claws engage the edges of the slices in a stack of products. The claws are then simultaneously cammed outwardly, although not as far outwardly as they were when first lowered around a stack of products, and then back into engagement with the edges of the slices. This cycle of operation of the claws is repeated one or more times with the claws being cammed outwardly a slightly shorter distance each time.

This inward and outward movement of the claws brought about by cam roller 329 traveling along cam track roller 285c acts to square-up or vertically align the stacks of sliced products on the platform of loading conveyor 350. This stacking feature is of special importance when the stacks of products are manually placed on the platforms as the personnel involved in such a loading operation will not always place the stacks of products on the platform in perfect vertical aligned form.

As the cam rollers of a loading assembly enter cam track portions 283d, 284d and 285d and pass along the same, all vertically movable components of the product loading assembly move upwardly in unison with the claws in gripping engagement with a stack of sliced products. It will be understood that when the claws are in gripping engagement with a stack of sliced products, the inner faces of the vertical portions of the claws are pressed against the edges of the slices and the inwardly extending claw fingers 324a engage marginal portions of the undersurface of the lowermost slice in the stack of products. It should be noted that recesses 363 (FIG. 8) in loading platforms 358 permit fingers 324a of the claws to come into lifting engagement with the marginal portions of the lowermost slice of a stack supported on one of the platforms.

Now cam rollers 342, 312 and 329 travel along respective cam track portions 283e, 284e and 285e, the various vertically movable components of the product loading assemblies travel at a constant elevation with the stacks of products being gripped by the claws thereby to carry the stacks from the loading conveyor 350 to the advancing web 128 (FIGS. 2b and 5) of base material. It will be understood the web is advanced by the lower die plates 440 which are in effect a conveyor with a horizontal run. When the various cam rollers of a loading assembly reach the end of cam track portions 283e through 285e, a stack of food products being gripped by the product loading assemblies is brought into overlying relation with one of the bases in the base web of package forming material and moved downstream in timed relation with the base web, i.e., as a product loading assembly is brought to the position where its cam rollers are at the end of cam track portions 283e through 285e, the stack of products carried by the assembly is directly vertically aligned over one of the bases and moved downstream at the same velocity as the web of base material.

When the cam rollers of a product loading assembly enter cam track portions 283f, 284f and 285f and are cammed downwardly by the same, the various vertically movable components of the product loading assembly are moved downwardly in unison until the undersurfaces of the claw fingers 324a engage the rim of a package base 129 thereby to press the latter firmly against a supporting lower die plate.

In FIG. 9 it will be noted that cam track portion 283f continues downwardly a short distance after cam track portions 284f and 285f level off and join with repective cam track portions 284g and 285g. This engagement forces cam roller 342 downwardly with respect to cam roller 312, thereby to urge rod 343 downwardly for bringing pad 346 into engagement with the upper surface of the top slice of a stack of products. Spring 348 provides for yielding engagement of the pad with the stack of products.

As cam rollers 342 and 312 continue along respective cam track portions 283g and 284g, cam roller 329 is cammed downwardly by camp track portion 285h. It should be pointed out that this downwardly camming of roller 329 does not occur until pad 346 is brought into contact with the stack of products. This downward movement of cam roller 329 forces cam member 326 downwardly thereby to spread the claws for releasing a stack of products on one of the formed bases 129. Spring biased pad 346 acts to hold the stack of products on the formed base during retraction or expanding of the claws.

When cam rolers 342, 312 and 329 enter respective cam track portions 283h, 284h and 285i and are cammed upwardly by the same, all vertically reciprocable components of the package loading assembly are cammed upwardly in unison. This action lifts the expanded or spread claws and pad 346 away from the stack of products that have been deposited or loaded on one of the advancing formed bases. The various cams rollers of the package loading assembly then enter cam track portions 283a through 285a as the empty product loading assemblies move around toward feed conveyor 350 for picking up stacks of products to be deposited on the advancing bases. It will be apparent that the package loading mechanism of this invention serves successively to deliver stacks of products to the advancing bases in a continuous and automatic manner. While the invention has been shown in but one form, it will be obvious to those skilled in the art it is not to be so limited.

We claim:

1. In a machine wherein a horizontally disposed planar member is advanced along a horizontal run, mechanism for continuously depositing products on said member as the same is advanced comprising, an endless series of product loading assemblies each including a frame, means for moving the frames in an endless horizontal path a portion of which path parallels and horizontal run above the latter, which means move said frames along said portion at a velocity equal to the velocity of said member, each frame including a vertically extending sub-assembly which is mounted on the associated frame for vertical reciprocal movement relative thereto, which sub-assembly includes a first cam follower, each of said sub-assemblies including at its lower end a plurality of product gripping claws mounted in a common horizontal plane, which claws are mounted for horizontal movement toward and away from a point equidistant from each claw, said claws being adapted, when moved toward said point, to support a product and being adapted, when moved away from said point, to release the product, each sub-assembly including cam means for actuating said claws, which cam means includes a second cam follower, first and second cam tracks engageable with said first and second cam followers respectively and arranged successively to lower each sub-assembly as it approaches said path portion for lowering the products gripped by the claws to a position just over said member, and then successively to actuate each cam means to release the products so lowered, each of said product loading assemblies including a pad mounted between the claws for vertical movement relative thereto, means yieldably urging said pad downwardly relative to the claws and into engagement with the product when the same is being gripped by said claws thereby to hold the product on said member during movement of the claws away from each other.

2. In a machine for forming packages wherein a continuous web of package forming material is advanced along a horizontal run, mechanism for continuously depositing stacks of sliced food products on said web as the same is advanced, said mechanism comprising, an endless series of product loading assemblies each including a frame, means for moving the frames in an endless horizontal path a portion of which path parallels said horizontal run above the latter, which means move said frames along said path portion at a velocity equal to the velocity of the web, each of said assemblies including a vertically extending subassembly which is mounted for vertical reciprocal movement relative to the associated frame, which sub-assembly includes a first cam follower, each of said sub-assemblies having means defining a vertical central axis and each sub-assembly including at its lower end a plurality of equally spaced claws, which claws are mounted for horizontal movement in a common plane in either direction along respective radii which intersect said axis, said claws each having a vertical portion for engagement with the edges of slices forming a stack of products and a radially inwardly extending finger for engagement with the underside of the lowermost slice in the stack, each sub-assembly including a cam assembly supported therefrom for vertical reciprocal movement, which can assembly includes a cam engaged with all of said claws and adapted upon movement in one direction to cause all of the claws of the associated sub-assembly simultaneously to move outwardly thereby to release a stack and adapted upon movement in an opposite direction to cause all of the associated claws simultaneously to move inwardly thereby to grip a stack, each cam including a second cam follower, first and second cam tracks engageable with said first and second cam followers, respectively, successively to lower each sub-assembly as it approaches said path portion for lowering onto the web the products gripped by the claws, and then successively to move each cam in said one direction to release the products so lowered, said second cam track including a sinuous portion receiving said second cam followers before the associated cams are moved in said one direction, and sinuous portion being arranged successively to reciprocate said cams for moving the associated claws inwardly and outwardly through a stroke less than their full stroke thereby to align the stacks of products by engagement of the vertical portions of the claws.

3. The mechanism according to claim 2 wherein each product loading assembly supports a product hold-down assembly for vertical reciprocal movement relative thereto, which hold-down assembly includes a vertical stem coaxial with said axis and having a horizontally disposed pad at its lower end, which pad is adapted to rest on the upper surface of a stack of products gripped by the associated claws, each product hold-down assembly having a third cam follower, and a third cam track engageable with said third cam followers and arranged successively to cam each product hold-down assembly downwardly after the associated sub-assembly has been lowered but before the associated claws have been moved outwardly, thereby to hold the products on the web during subsequent outward movement of the claws.

4. The mechanism according to claim 2 further defined by, said means for supporting and moving said frames being arranged to move the frames along another linear path portion, a product feed conveyor supported and arranged successively to deliver stacks of sliced products beneath said product loading assemblies as the latter move along said linear path portion, and conveyor including a plurality of platforms each being adapted to support a stack of products thereon, each platform having edge portions corresponding in number and arrangement with the number of claws and adapted to be spaced inwardly of the edges of the edges of the lowermost slice on the platform thereby to expose marginal underside portions of the lowermost slice, said conveyor being adapted to deliver the stacks of products at a velocity equal to the velocity of the product loading assemblies as the latter more along said linear path portion, said first claw track including an extension arranged successively to engage each of said first cam followers for forcing each sub-asembly downwardly as it reaches said linear path portion to locate the associated claws at the edges of stacks of sliced products on one of the platforms, said second cam track including an extension arranged successively to engage said second cam followers for moving the cams in said opposite direction to bring the jaws inwardly into engagement with the stacks of sliced food products with said fingers in lifting engagement with said marginal underside portions, respectively, of the lowermost slice of the stack.

5. The mechanism according to claim 2 further defined by, each of said product loading assemblies including a pad mounted between the claws for vertical movement relative thereto, means yieldably urging each of said pads downwardly relative to the claws and into engagement with the product when the same is being gripped by said claws thereby to hold the product on said member during movement of the claws away from each other.

References Cited
UNITED STATES PATENTS 2,611,493   9/1922   Nordquist _____ 214—1

RICHARD E. AEGERTER, Primary Examiner.

U.S. Cl. X.R.

214—1